UNITED STATES PATENT OFFICE.

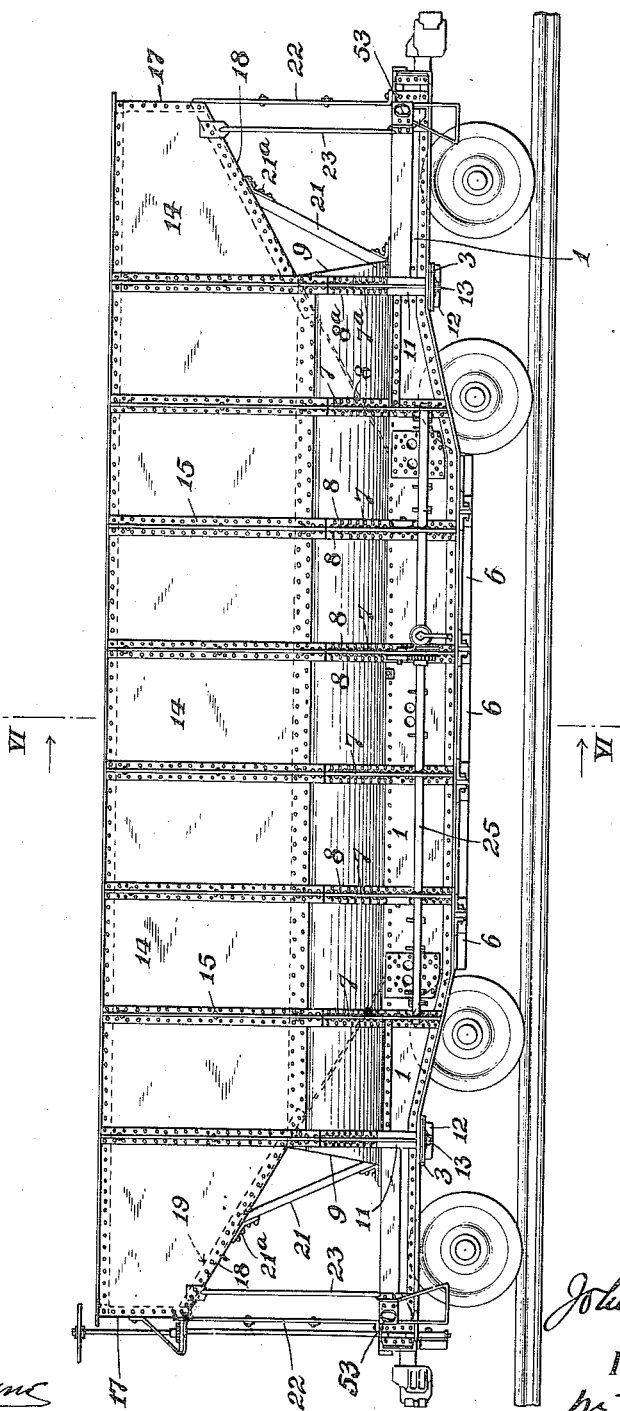

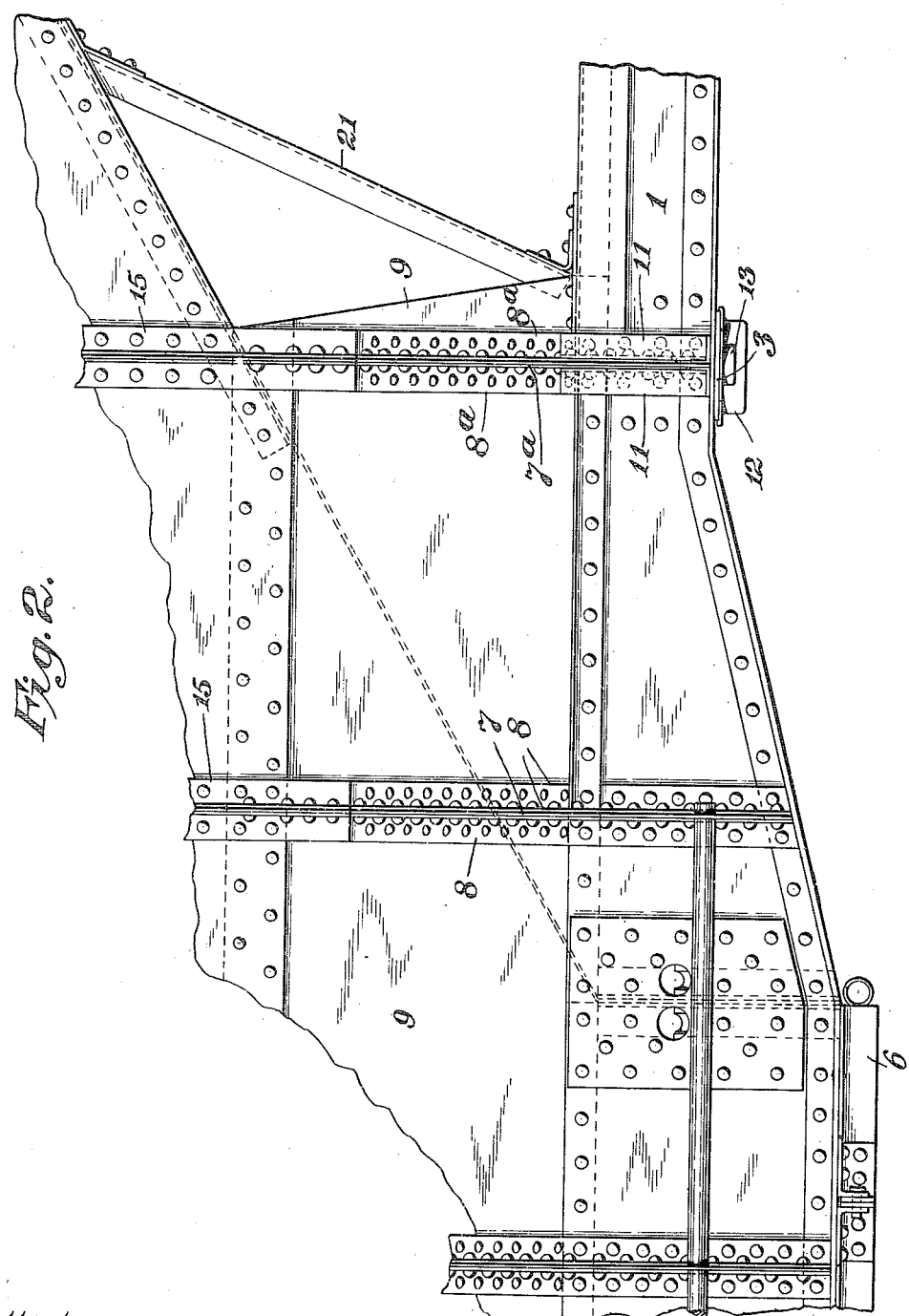

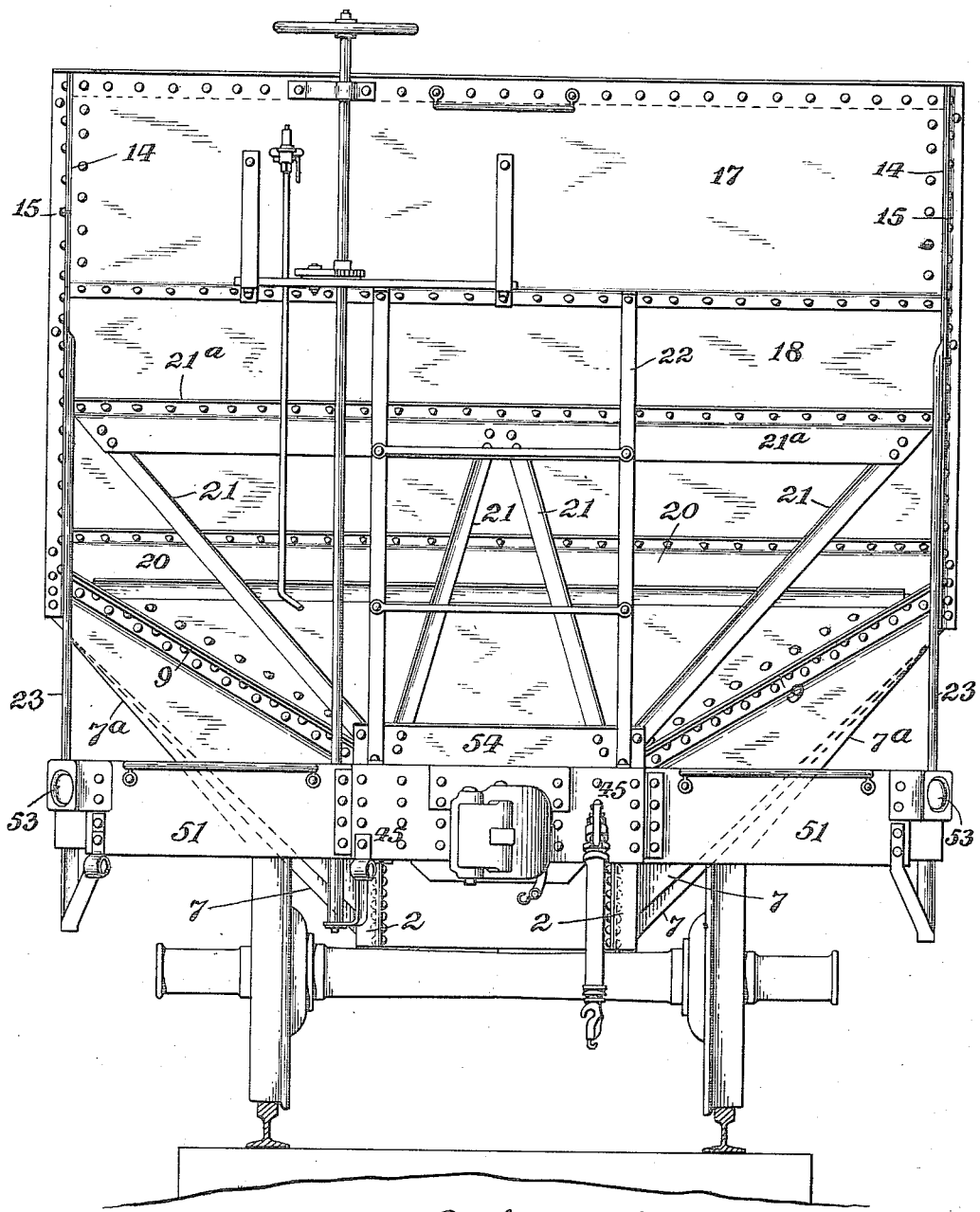

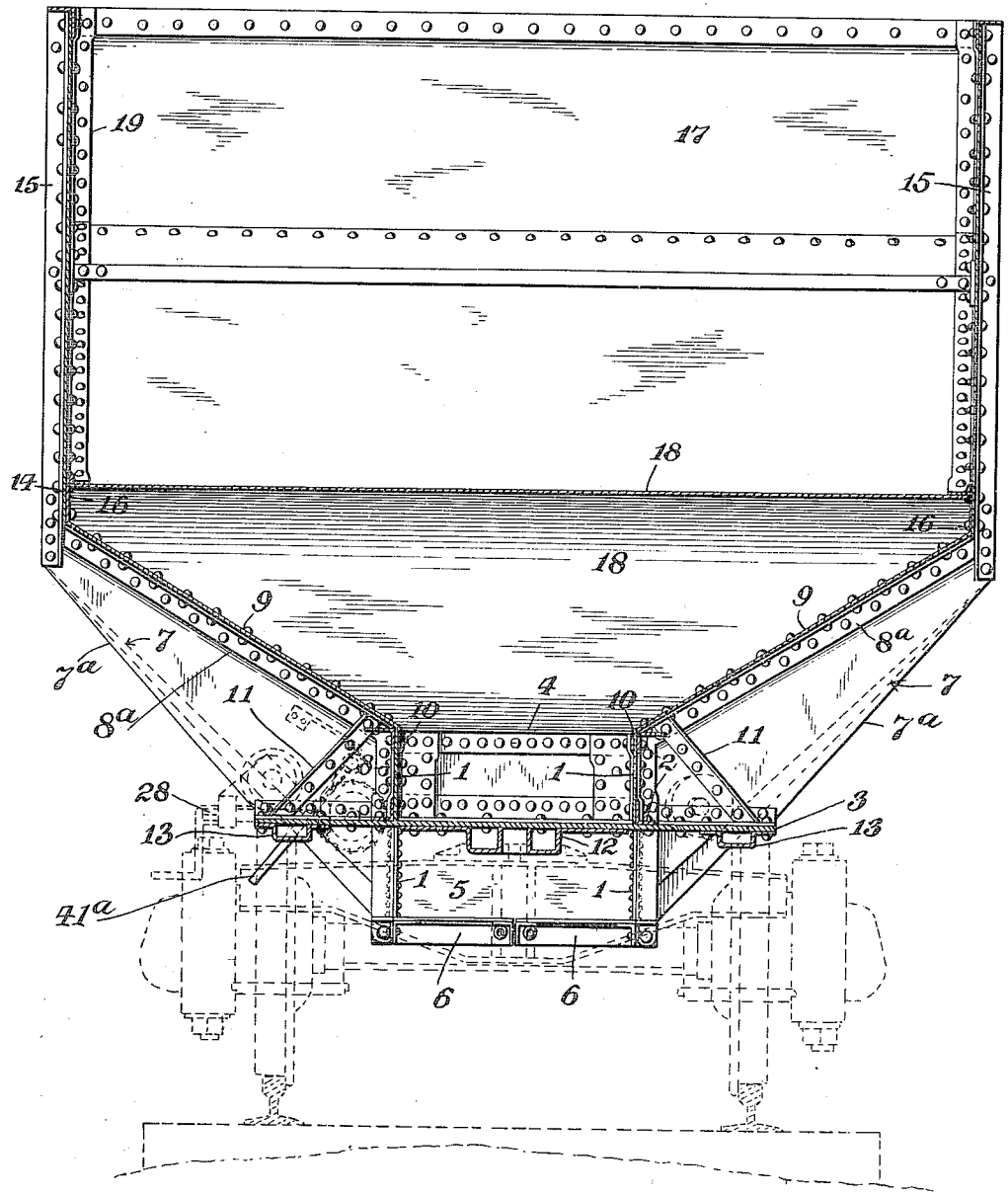

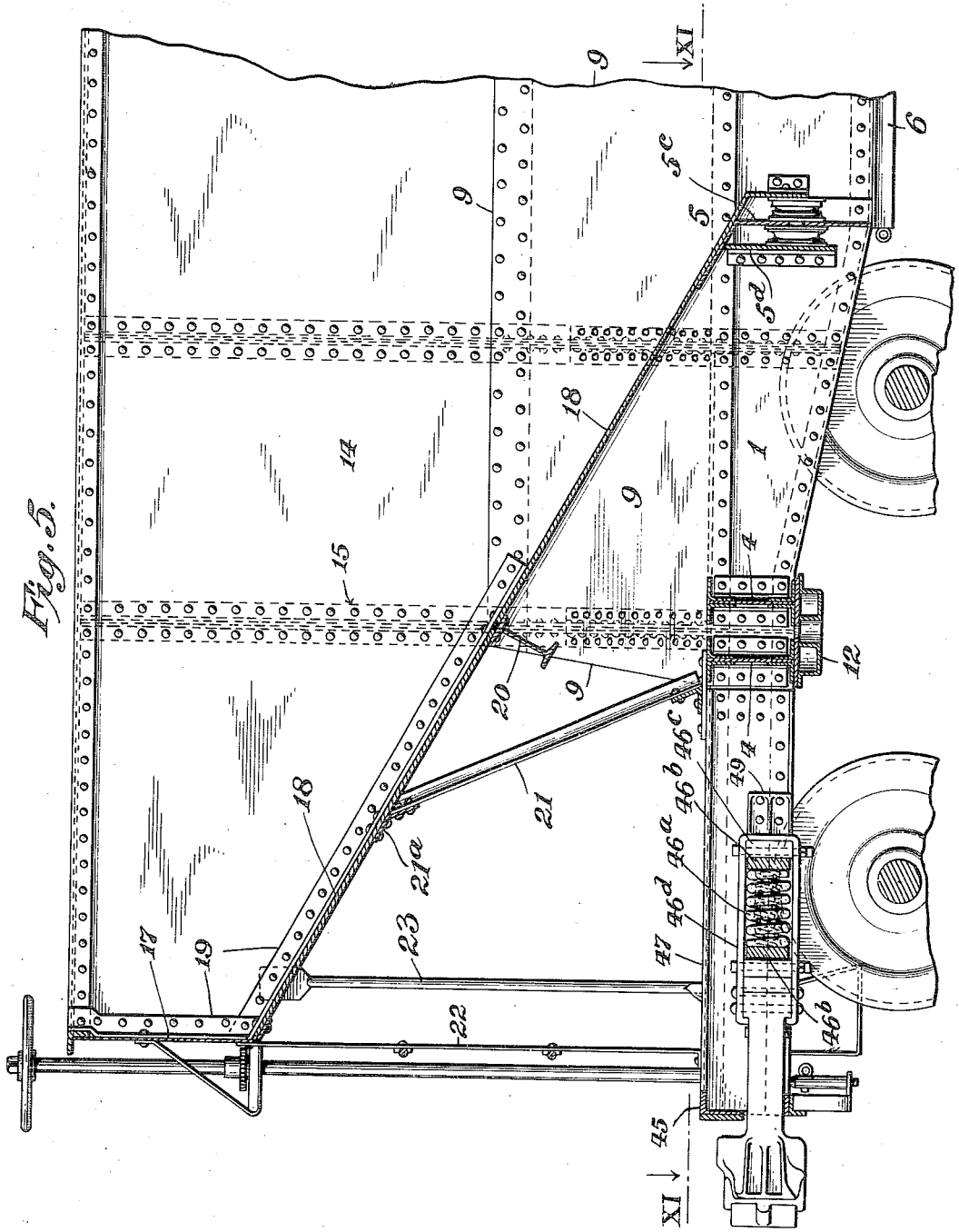

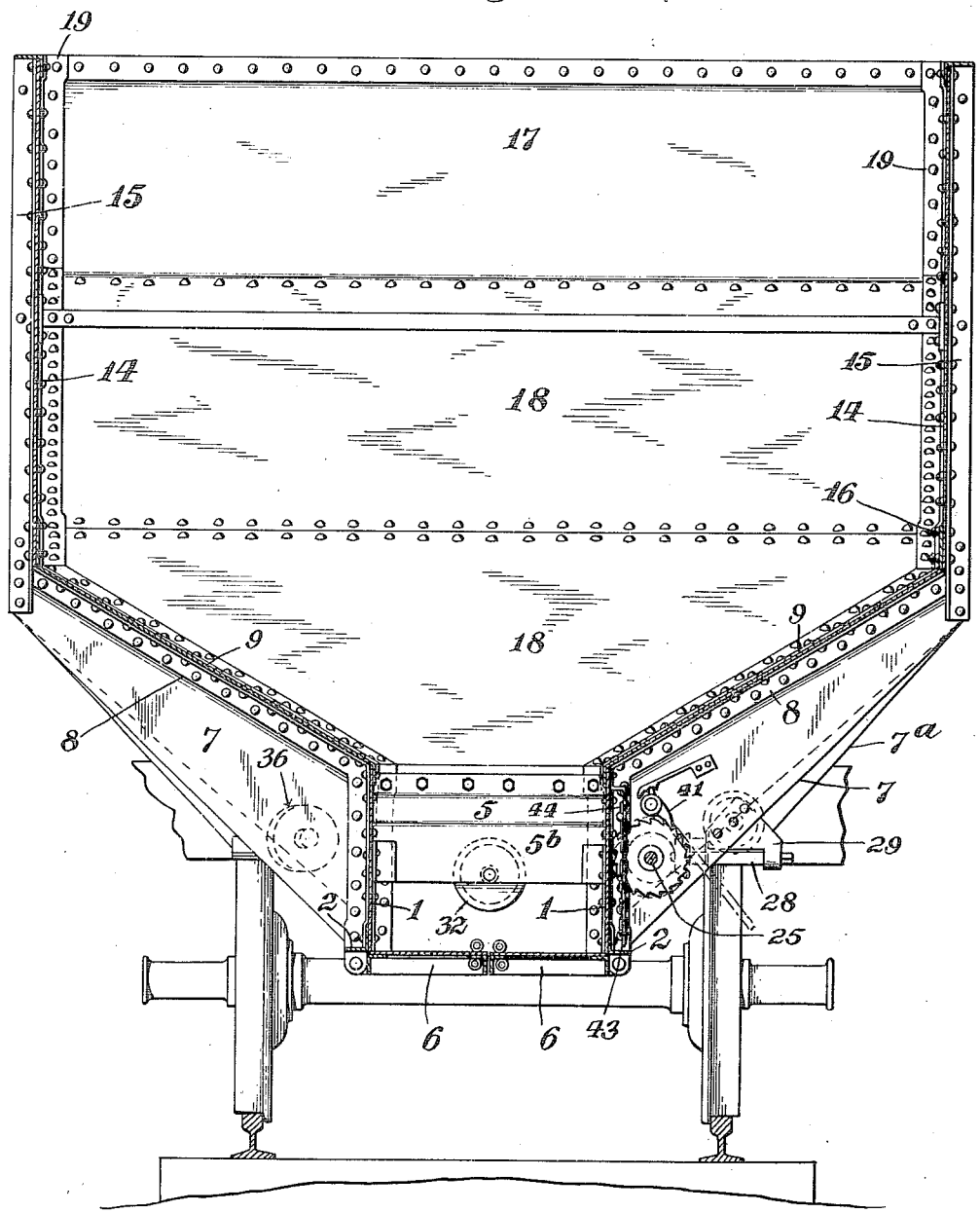

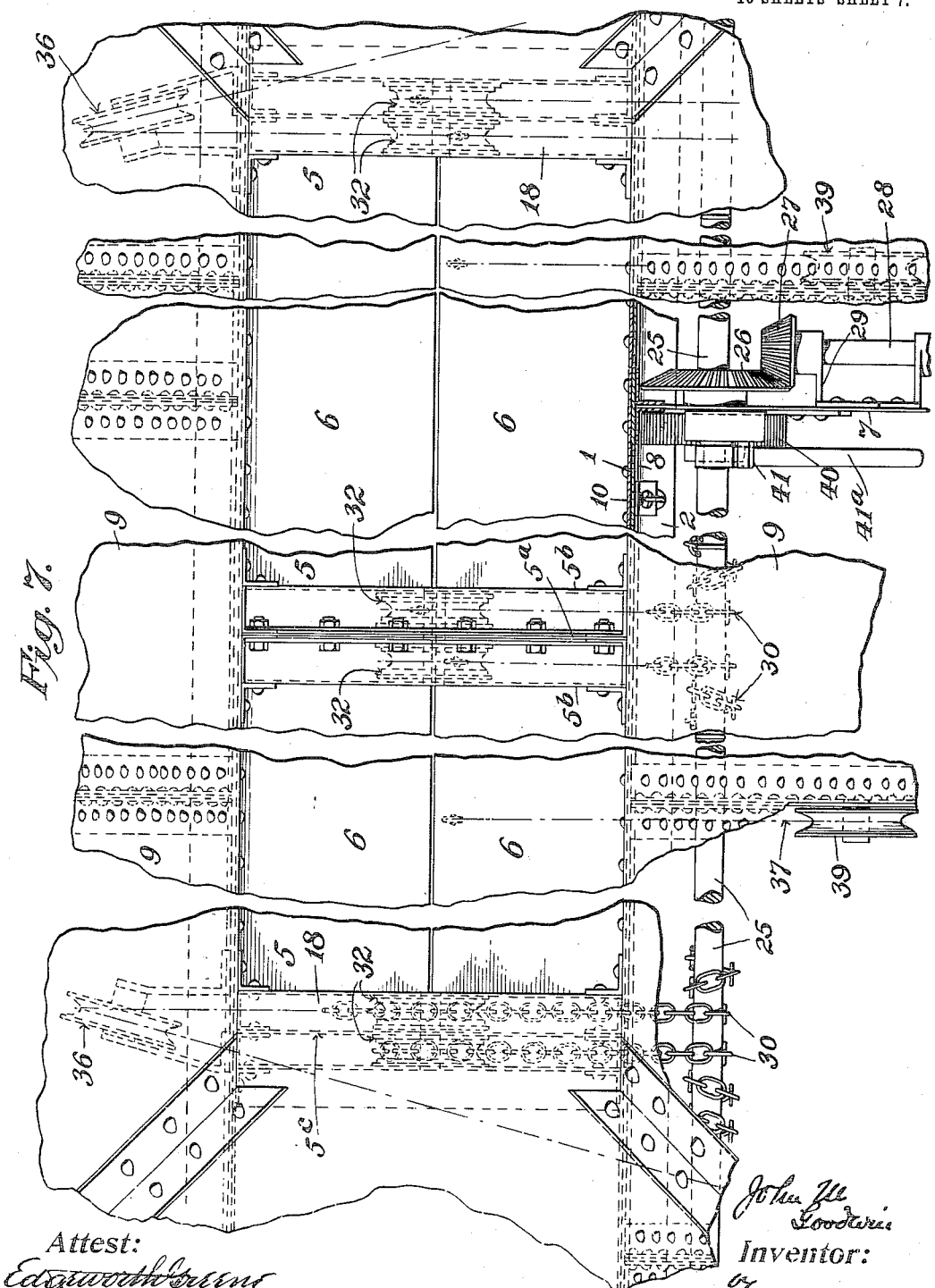

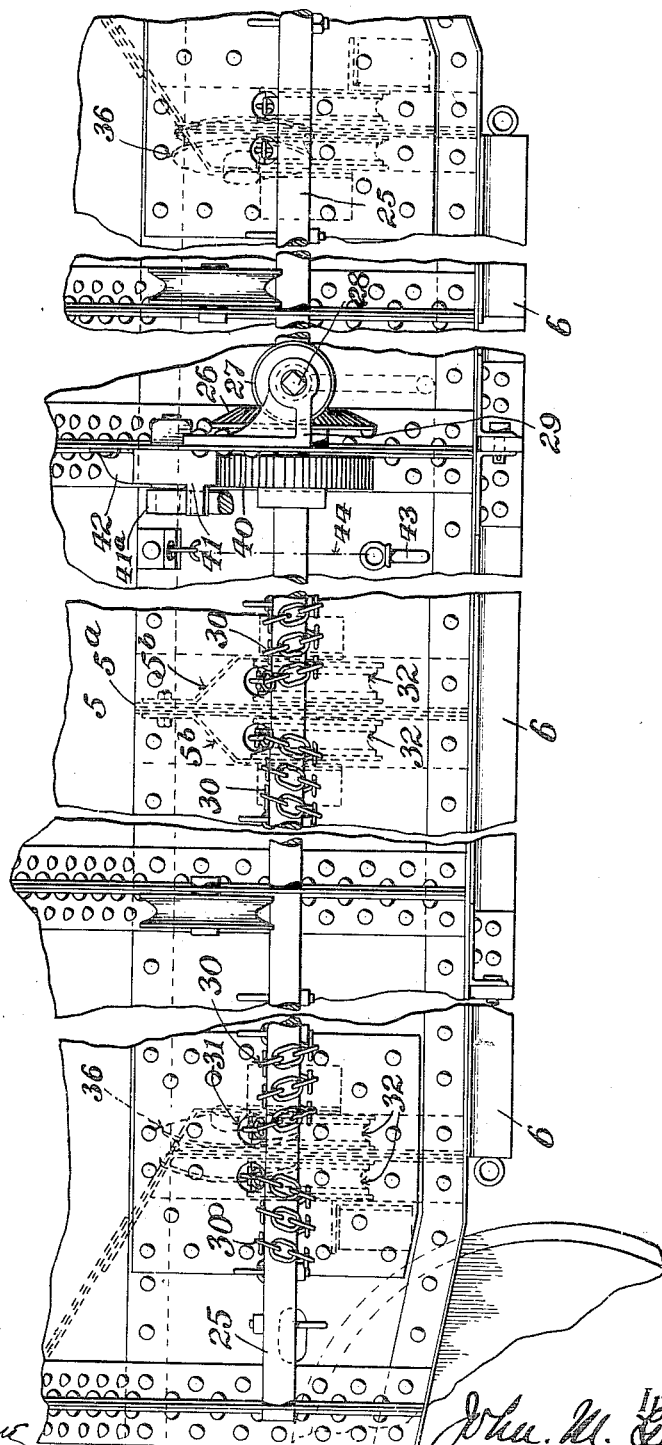

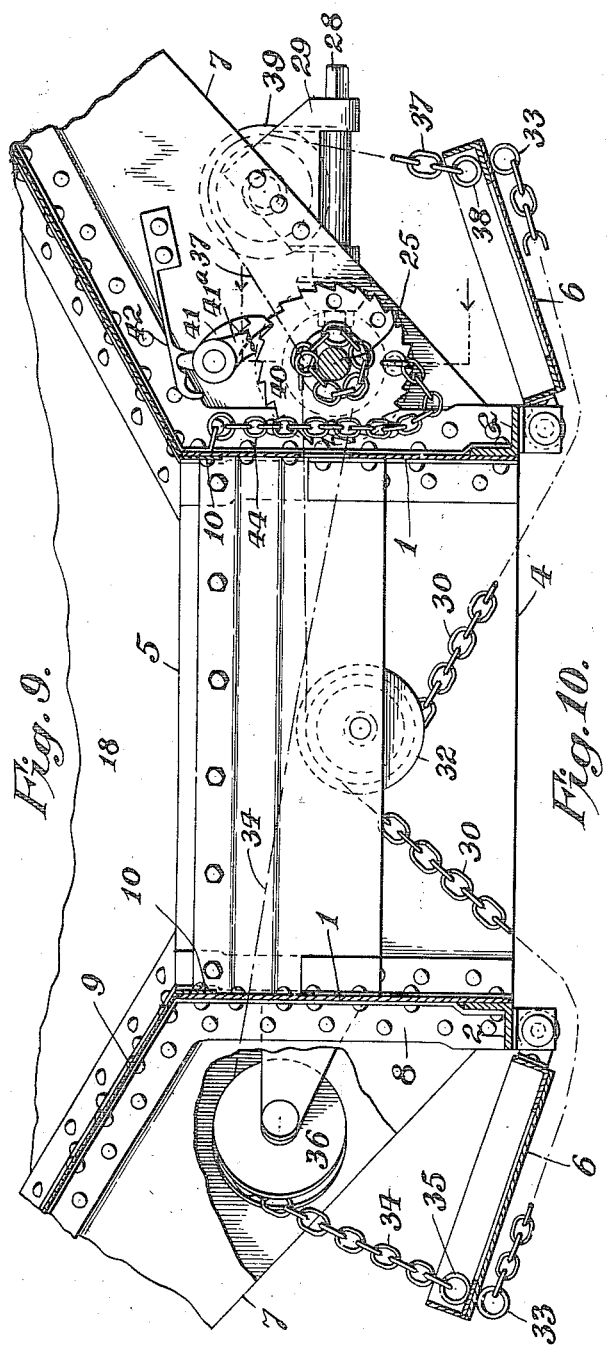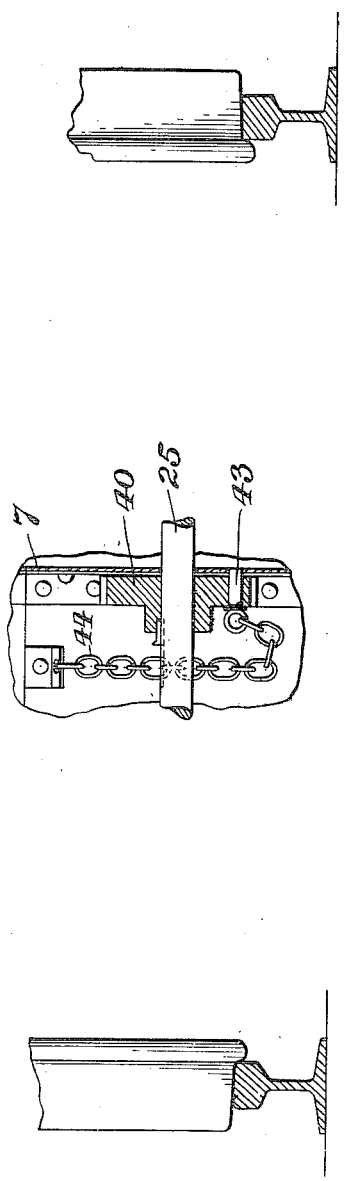

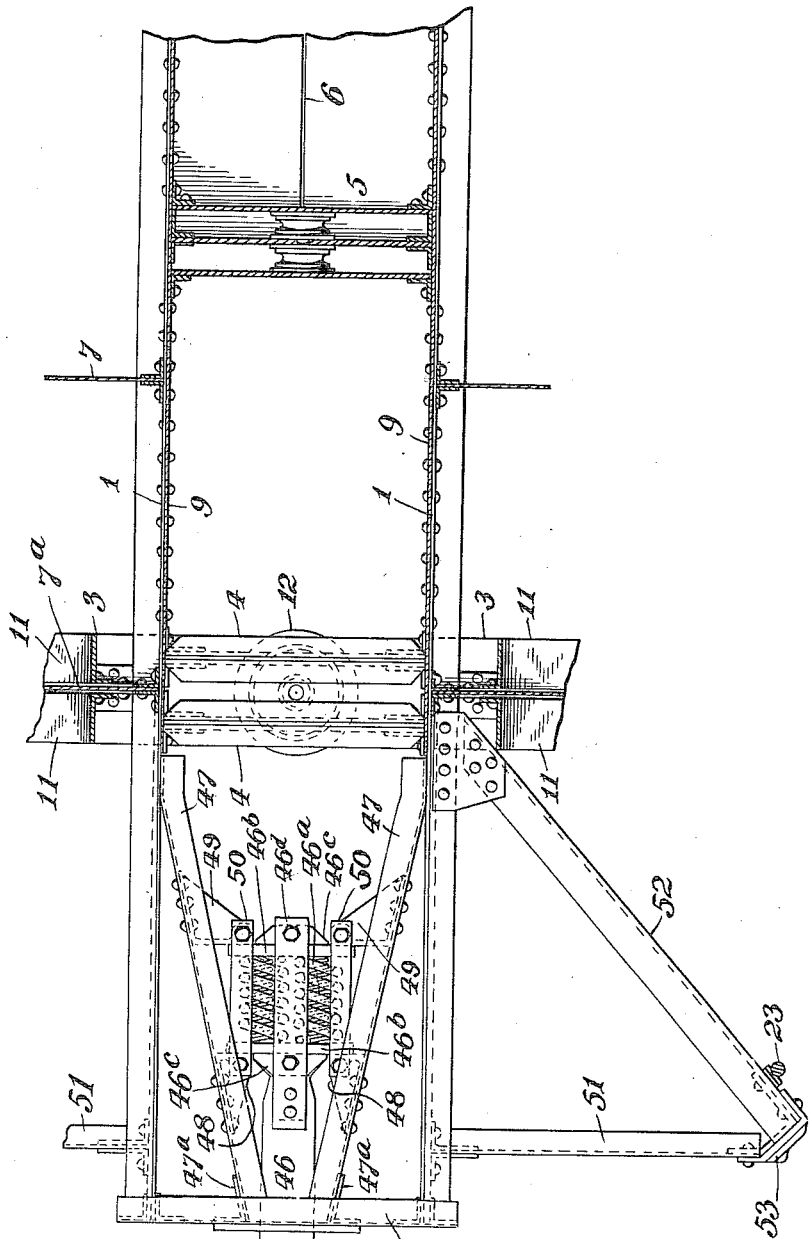

JOHN M. GOODWIN, OF MOUNT VERNON, NEW YORK.

DUMPING-CAR.

971,603.   Specification of Letters Patent.   Patented Oct. 4, 1910.

Application filed February 5, 1907. Serial No. 355,815.

*To all whom it may concern:*

Be it known that I, JOHN M. GOODWIN, a citizen of the United States, residing in Mount Vernon, in the county of Westchester and State of New York, have invented certain new and useful Improvements in Dumping-Cars, of which the following, taken in conjunction with the accompanying drawings, is a full, true, and concise specification.

My invention relates to dumping vehicles or railway cars with the object to produce a center dumping sheet-metal car, which will combine maximum carrying capacity with minimum weight and complication in construction, and at the same time will be provided with a wide central discharge opening; and the invention, as will hereinafter be explained and more particularly pointed out in the claims, involves to this end certain important constructions, combinations of parts and sub-combinations thereof, all looking toward the above stated objects and the facility of manufacturing the car. The invention also includes the valve-operating mechanism and its mode of adaptation to the car structure and the several features thereof as pointed out in the claims.

In the drawings, Figure 1 is a side elevation of a center-dumping hopper-bottom car constructed in accordance with my invention; Fig. 2 is an enlarged side elevation of a detail of the car taken at the region of the point of truck support; Fig. 3 is an end elevation of the car of Fig. 1; Fig. 4 is a vertical transverse sectional view in the same scale as Fig. 3. and taken substantially in the plane of the truck support; Fig. 5 is a longitudinal central section of one end of the car; Fig. 6 is a similar section on line VI—VI of Fig. 1; Fig. 7 is an interior plan with intermediate parts broken out, showing the cross-braces between sills and the arrangement of the valve-operating mechanism; Fig. 8 is a side elevation of the parts shown in Fig. 7; Fig. 9 is an enlarged transverse section of the discharge passage, showing the valves and their operating means; Fig. 10 is a detail of the locking means for the valve-operating shaft; and Fig. 11, a horizontal section on line XI—XI of Fig. 5.

The means for supporting the load of the car upon the trucks comprises two sills 1, 1 which, being located somewhat inboard of the truck-wheels, are herein referred to as center-sills. They have attached at their ends the usual buffer-plates, and coupler-heads and the draft-rigging presently described, so that the hauling and buffing strains to which the vehicle is subjected are therefore taken up directly and primarily upon these two longitudinal members and transmitted through them in the direction of their length. Somewhat inward of their extremities the center-sills are provided with a body-bolster construction presently described, at which points they rest upon the trucks, and inwardly of or between these two points the center-sills are made of greater depth than their end portions, which extend over the trucks. The sills may be conveniently made of metal plates cut to the shape above described and reinforced by means of angle bars 2 riveted to their outside margins. They are spaced apart from each other by means of several inter-sill cross-members which include the end cross-sill construction later described, the plate 3 and spacers 4 of the body-bolster construction and several hollow cross-braces forming housings, indicated generally by 5, for the chains and sheaves of the valve-operating gearing. The sills as thus separated provide a wide space between them as compared with the usual distance between the center-sills of dumping railway cars, and the portion of this space, which is bounded by the deeper portions of the sills, extends fore and aft to a point adjacent or above the inner truck wheels, being bounded at its ends by certain of the hollow cross braces or valve gear housings. This inter-sill space constitutes a part of the cargo receptacle and is provided with one or more discharge valves 6 at its lower part, so that it likewise constitutes the central discharge opening. The valves 6 of appropriate construction, are pivotally supported at or upon the lower margins of the sills, closing inward and upward as shown, and adapted to be positively operated in both their closing and opening movements by means of chains and sheaves, later described. Preferably the valves, of which there are two, one for each sill, are hinged directly to the out-turned flanges of the reinforcing angle-bars 2 (see Fig. 9). The draft-rigging is applied to these widely separated sills by means of the construction shown more clearly in Figs. 5 and 11, whereby the hauling and buffing strains, which are exerted at a point midway between the sills, are transmitted to the same as endwise strains. This arrangement obviates the use of special sills at or inward of the trucks, and permits the employment of the continuous central, load-supporting center-sill construction above explained, notwithstanding the abnormal width of the inter-sill discharge passage. The said construction comprises a short channel bar or cross-sill 45 secured to the extreme ends of the center-sills and perforated at its center to receive the draw-bar 46.

Radiating from the draw-bar opening are two diagonal channel bars 47 extending divergently to a point adjacent the body-bolster construction, where they are both firmly secured to the sides of the respective center-sills. The forward ends of said bars are secured by the angles 47ª to the short cross-sill 45, and said divergent bars constitute two inwardly projecting horizontal thrust-receiving brackets whereby the coupling or buffing shocks on the car are caused to be exerted longitudinally from buffer to buffer through the sills. At or near the point of attachment of the divergent bars 47 to the sills, the latter are tied together by the interior spacers or distance plates 4 above referred to, so that all tendency for the sills to spread or move laterally out of alinement is adequately counteracted. The buffer-plate is of sufficient length to span the ends of the bars 47. The draw-bar 46 extends into the triangular space between the divergent channel bars 47 and is provided with the usual arrangement of nested springs 46ª follower blocks 46ᵇ, follower castings 46ᶜ and tail-strap 46ᵈ. The followers find their fore and aft bearings against the rear faces of the short bearing blocks 48 and the forward faces of the relatively wider bearing blocks 49, respectively. These blocks are formed with inclined bases which are secured by rivets or bolts to the webs of the divergent thrust-bars 47 and the blocks on each bar are united or tied together by means of upper and lower longitudinal straps 50 (shown in plan view in Fig. 11). The extremities of the draw-bar followers play in the space between the straps at each side and by this means the inner end of the draw-bar is supported in position.

In operation hauling strains are exerted through the springs and forward follower to the forward bearing-blocks 48 and by them to the divergent bars 47, which in turn transmit said strains with longitudinal or endwise direction to the two continuous center-sills. By reason of the divergent relation of the bars 47 the thrust on the forward bearing-blocks has but slight tendency to shear the bolts by which the same are held in place, the action being somewhat analogous to that of a wedge, and the tendency to shearing is further averted by reason of their connection with the rearward blocks, through straps 50, and the strains on the latter blocks are tensile rather than shearing. In the case of pushing or coupling strains, the rearward draw-bar follower abuts against the relatively wider bearing-blocks 49, and the tendency of the latter to become displaced or loosened is offset by the connection of their extended apices with the forward bearing-blocks, through the straps 50, which as above stated, tie the two pairs of blocks together. By this arrangement all of the usual strains on the draw-bar mechanism are immediately converted into endwise strains in the center-sills. In like manner the pushing strains of the poling sockets 53 are similarly transmitted through exterior thrust-transmitting bracket constructions, to the two center-sills. This construction (Fig. 11) comprises at each corner of the car a lateral, horizontal angle or channel beam 51 secured to the exterior of a center sill, just abaft the short end sill 45, and a diagonal strut-bar 52 firmly secured to the exterior of the same sill at or near the body bolster, the two outboard extremities of said bars being united by means of the push-pole corner-plate 53 or by other means to which said corner-plate is attached.

The two center-sills as thus equipped constitute the lowermost supporting members of the load-carrying structure of the car, no other sill members being necessarily required, and the body of the cargo receptacle is combined with and united to the center-sills so that it coöperates with the sills in the performance of this function in the following manner: A series of exterior and upwardly inclined supporting members or braces 7 is firmly secured to the outside of each sill at frequent intervals along their lengths. The supporting members, while capable of different formations, preferably take the form of triangular-shaped sheet-metal plates, herein termed gusset-sheets, and are secured to the sills by means of riveted angle irons 8 in the corners on each side thereof. The inclined side floors 9 of the hopper-bottom cargo receptacle or the car body proper, are supported upon the gusset sheets with their inboard margins 10 secured to and preferably lapped over the upper edges of the sills, as most clearly shown in Fig. 9, and are firmly secured to the upper edges of the gusset sheets 7 by means of angle-bars 8 in the same manner as the said sheets are secured to the sills. The gusset sheets are also of sufficient lateral dimension to reach to the extreme outboard margin of the side floors so that the outer margin of each side floor is supported directly thereby, and the load upon said outer margins is transmitted by said sheets directly to the center-sills. As thus arranged the two inclined side floors 9 extend longitudinally to a point above the truck-centers or points of sill support, where they are united to the body-bolster construction, so that they are coextensive with the said sills for so much of their length as spans the trucks and for that portion of them that is subjected to the vertical strains of the load. Preferably the said inclined side floors extend slightly farther toward the ends of the car, at their inboard margins than at their outboard margins (see Figs. 1 and 2) so as to provide sufficient area for proper connection to the sill and to the body-bolster construction.

The construction just described constitutes an important feature of my invention, for by the continuation of the inclined side-floor beyond the ends of the discharge opening and to or beyond the body bolster upon which it is supported, it is brought into active coöperation with the sill member, forming therewith a girderlike support for the load which has exceptional strength as to vertical and outward strains, this arrangement being independent of such other functions as may pertain to the sills themselves.

The body-bolster construction comprises at each end of the vehicle two correlated upright supporting members or gusset sheets 7ª (Fig. 4) similar to the intermediate gusset sheets 7 but formed of slightly different shape, so that they can be secured by means of one or more angle-irons 8ª, similar to angle-irons 8, to the bottom of the side floors 9, to the sides of the sills 1, and likewise to the laterally projecting extremities of the bolster plate 3. These gusset sheets are each stiffened by diagonal reinforcements, in the form of two inclined angle-bars 11, 11, located respectively on opposite sides of and secured together through the sheet, the said bars being arranged to extend from a point near the lower margin of the inclined floors to the extremity of the bolster-plate, and together with the parts above described and the inter-sill braces 4, 4 constitute an exterior supporting diaphragm between the floors, sills and bolster-plate, which is in the vertical plane of the truck bolster or point of support. On the bottom of the bolster-plate are attached the center bearing 12 and the usual side bearings 13, which latter are thus at the extremities of the diagonal braces 11.

The upright side walls 14 of the cargo receptacle, which may be of any suitable height and construction, are provided with a number of outside vertical flanges or applied cleats, shown herein as composed of opposed angle-bars 15. These are spaced similarly to the gusset sheets and firmly connected by their bases to the uppermost ends thereof, so that the vertical side walls of the car also coöperate in a material degree with the inclined side floors and the sills, in stiffening and strengthening the structure, without, however, adding extra weight to the vehicle. The side walls are also connected to the tops of the inclined floors 9 by means of upturned flanges 16 on the latter, which are riveted to the lower margins of said walls.

The end bulkheads of the hopper-bottom cargo-receptacle, consisting of short upright end walls 17 and inwardly inclined end floors 18, are secured to the vertical side walls 14 and inclined side floors 9 by the angle-bars 19 riveted in the four corners of the hopper receptacle, and said floors are sustained from below by means of the cross-beams 20 (Figs. 3 and 5) and series of diagonal struts 21, which radiate from a tie-plate 54 (Fig. 3) at the ends of the center-sills and engage with the end floors 18 by means of flanged cleats 21ª secured transversely across their bottom sides. The inclined end floors 18 lead downwardly to the central discharge passage, and have their inner edges in registry with or secured to one of the hollow cross-braces 5 above referred to, so that the inclined side floors 9 extend beyond the lower portions of said end floors. A ladder 22 and suitable hand-rods 23 are located at the end of the car body, the latter being secured to the strut bars 52 of the poling bracket construction above referred to.

The valve-operating mechanism, seen most clearly in Figs. 7, 8 and 9, comprises a longitudinal winding shaft 25 located in the exterior angle between one of the center sills and its adjacent side floor, and journaled in appropriate apertures in the gusset sheets 7. Said shaft is rotated by a bevel gear 26 in mesh with a pinion 27 on the end of the short crank shaft 28 (Fig. 7), which latter is journaled in a bracket 29 fastened to one of the gusset sheets. The chains 30 wound on the shaft 25 in the same direction, pass through holes 31 in the adjacent center-sill and over sheaves 32 carried within the hollow cross-braces 5 and from thence lead to the staples 33 on the upper sides of the valves, the chains 34 secured to the staples 35 on the under side of the valves and on the opposite side of the discharge opening, lead over the sheaves 36, from thence through the hollow cross braces 5 to the winding shaft, upon which they are wound in an opposite sense to that of the chains 30. The chains 37 are similarly secured to their adjacent valves by staples 38, being passed over the sheaves 39 and from thence directly to the shaft 25, upon which they are wound similarly to the chains 34.

The valve gearing above described is so adjusted that the rotation of the shaft 25 in one direction will wind up one set of chains and unwind the other and vice versa, thereby causing the opening and closing movement of the valves in obvious manner, and by a continued rotation of the shaft in the proper direction, the valves may be opened wide and turned back as indicated in Fig. 9, which is advantageous when it is desired to inspect or assist the escape of the cargo.

In order for the valves to be held closed a ratchet wheel 40 is arranged on the shaft 25 and a pawl 41 carried by one of the gusset sheets engages with the teeth thereof in ordinary manner, but may be held removed from such engagement by means of a spring detent such as shown at 42 or by any other equivalent means. The pawl is capable of manual release, as for dumping the car, by means of a lever or handle 41ᵃ which is pivoted on the pawl pivot and engages a lateral projection of the pawl. This handle may be made removable, if desired. A further and independent locking means adapted for holding the valves open, is also provided in the form of a pin 43 on a tether chain 44, shown in Figs. 9 and 10, which is adapted to be thrust into registering apertures bored through the gusset sheet and the web of the ratchet wheel.

The valves on each side of the discharge passage may be formed as single structures on each side or as several longitudinally adjacent members, or they may be hinged transversely to the sills, by slight modification, if desired. As shown herein they are hinged directly to the sills and the closing chains 30 are connected to them at sufficiently close intervals for properly holding the load. In the present drawings, there are shown three closing chains for each of the two valves, and two chains per valve for holding them wide open, and there are sufficient hollow cross-braces to inclose the sheaves and chains where they cross the discharge passage. The said cross-braces 5 may be formed in a variety of ways to accomplish their described functions of distance blocks and housings for the valve gearing. In the form shown herein, (Figs. 7, 8 and 9) the central cross-brace which divides the discharge passage in two is formed of three transverse plates, the central plate 5ᵃ being flat and the two side-plates 5ᵇ being offset (as shown in Fig. 8) so as to give the member a considerable lateral dimension and to provide two interior compartments. The cross braces which bound the discharge opening at its ends (shown in Fig. 5) are formed in similar manner, but the central plate 5ᶜ is bent back, and the inner end of the floor 18 is bent over it and forms one of the side plates of the cross-brace, while the third plate 5ᵈ is flat and serves merely to support the free end of the sheave arbor. The several transverse plates of which the cross-braces are thus formed, are secured to the sills by means of angle irons riveted in the corners between them and the sills, and by reason of their offset formation are rigid and offer the least obstruction to the escaping cargo, if required to be located across the discharge passage, as in the case of the central brace herein shown, or in the case of a different arrangement of valves or valve sections. The sheaves 32 are mounted in the compartments between the several plates and adequate space is provided above them for the passage of the opening chains, such as chains 34.

Having described my invention, what I claim and desire to secure by United States Letters Patent, is:

1. A hopper bottom dumping car comprising on each side a longitudinal sill member forming a lateral boundary of the discharge passage and extending between the points of truck support, an inclined side-floor member having its inboard margin contiguous to the top margin of said sill member coextensively therewith between the said points of support, and an upright side-wall secured to the outboard margin of said inclined floor, the aforesaid members being rigidly joined together by means comprising a series of upright braces secured in the exterior angle between said floor and sill members and disposed at intervals along the same, from truck to truck.

2. A hopper bottom dumping car comprising a longitudinal sill member forming a lateral boundary of the discharge passage and spanning the track bolsters, an inclined side-floor member having its inboard margin supported on said sill member and coextensive therewith for the distance between its points of truck support, and an upright side-wall secured by its lower margin to the upper margin of said floor member, said parts being united by means including a series of upright angle-braces secured in the exterior angle between said floor and sill members, in combination with upright bolster-plates uniting the sill members of opposite sides of the car.

3. In a hopper bottom dumping car, two longitudinal sills spanning the truck bolsters, located inboard of the wheels, and providing a discharge passage between them, inclined end floors leading to said passage, inclined side-floors leading to said passage and having their lower inboard margins secured to said sills and extended beneath said end floors, in combination with a series of gusset sheets secured to the bottoms of said side floors and the outer sides of said sills, at intervals between trucks.

4. A hopper bottom metallic dumping car without side sills, comprising two longitudinal sill members located inboard of the wheels and extending from buffer to buffer, said sill members being spaced apart to provide a discharge passage between them, dumping valves closing the bottom of said passage and a car-body having inwardly inclined side-floors carried by said members with their lower margins adjacent thereto.

5. In a hopper bottom dumping car two longitudinal sills located inboard of the wheels and providing a central discharge passage between them, said sills extending from buffer to buffer, in combination with dumping valves closing said passage, a series of upright and upwardly inclined supporting members secured at intervals along the exterior of said sills and a car-body having inclined side floors leading to said central passage and supported on said members.

6. In a hopper bottom dumping car two longitudinal sills located inboad of the wheels and extending from buffer to buffer, said sills being spaced apart to provide a central discharge passage between them, and dumping valves closing the bottom of said passage, in combination with inclined side floors secured to said sills with their lower inboard margins adjacent to the tops of said sills and coextensive therewith for the distance between the points of truck support therefor.

7. In a hopper-bottom dumping car two longitudinal sills located inboard of the wheels and extending from buffer to buffer, said sills being spaced apart to provide a central discharge passage between them, in combination with inclined side-floors carried by said sills with their inboard margins secured thereto for the distance between the points of truck support and a series of gusset sheets secured in the exterior angle between said sills and side floors, disposed at intervals along the same.

8. In a hopper-bottom dumping car without side sills, two longitudinal sills located inboard of the truck wheels and extending from buffer to buffer, said sills being of greater depth at their central portions than at their portions over the trucks and spaced apart to provide a discharge-passage between their deeper portions, in combination with dumping valves closing the lower end of said passage and a car body having inclined side floors leading to the upper end thereof.

9. In a hopper-bottom dumping car two longitudinal sills located inboard of the truck wheels and extending from buffer to buffer, said sills depending at their central portions below the level of their points of support and spaced apart to provide a discharge passage between said deeper portions, in combination with inclined side floors having their lower inboard margins adjacent to said sills between said points of support, and a series of angle-braces in the exterior angle between said sills and floors.

10. In a dumping car without side-sills, two continuous center-sills extending from buffer to buffer and spaced apart to provide an intermediate discharge passage and inclined side floors coextensive with said passage and having their inboard margins secured to said sill, in combination with a series of angle braces between the outboard margins of said floors and the said center sills.

11. In a dumping car, two continuous center-sills extending from buffer to buffer and spaced apart to provide an intermediate discharge passage, valves hinged to the lower margins of said sills and inclined side floors having their inboard margins secured to the tops of said sills, in combination with a series of angle braces in the exterior angle between said floors and sills for supporting the outboard margins of said floors thereon.

12. In a hopper bottom sheet metal dumping car without side sills, two longitudinal sill members located inboard of the truck wheels and providing a cargo pocket and discharge passage between them, inclined side floors secured by their lower margins to said sill members and coextensive at top and bottom with said sill members for the full distance between their points of truck support, in combination with upright sidewalls secured by their lower margins to the outboard margins of said inclined floors, and a series of upright gusset sheets secured at intervals in the exterior angle of said floors and sill members, certain of said gusset sheets being disposed substantially in the transverse plane of the truck supports and having supporting connections with said upright side walls independent of said inclined floors.

13. A dumping car having two longitudinal center-sills without side sills, spaced apart to provide a discharge opening between them, upright side walls and inclined side floors leading to said opening, in combination with a series of braces located in the angle between said sills and floors, and secured to the said upright side walls.

14. In a hopper bottom dumping car two longitudinal sills located inboard of the truck wheels and providing a discharge-passage between them, inclined side floors secured by their lower inboard margins to said sills and upright side walls rising from the upper margins of said floors, in combination with a series of spaced angle braces in the exterior angle between said sills and floors, and a corresponding series of upright cleats on said side walls joined by their bases to the outboard extremities of said braces.

15. In a dumping car, a hopper-bottom car body and vertical members bounding the discharge opening thereof, the said members being extended longitudinally beneath the ends of said body and adapted for supporting the draft-rigging, in combination with horizontal bolster plates at the ends of said members and angle braces between the side floors of the car body and said bolster plates.

16. In a hopper bottom sheet metal dumping car the combination with the truck supports, of two longitudinal load supporting girder members formed respectively of a longiutdinal sill member supported by its ends on the said supports and constituting a lateral boundary of the discharge-passage, the inclined side floor of the car longitudinally coextensive with said member between its points of support and leading to said discharge passage, and a series of upright gusset members reinforcing the angle between said floor and sill member.

17. In a hopper bottom dumping car without side sills, two longitudinal sill members located inboard of the truck wheels and forming a discharge passage between them with longitudinally hinged dumping valves held to their lower margins, inclined side floors secured by their lower margins to said sill members and upright side walls secured by their lower margins to the outboard margins of said inclined floors, said side walls and inclined floors being continuous with said sill members for the full distance between the points of truck support, in combination with a series of upright gusset sheets secured at intervals in the exterior angle between said sill members and inclined floors and extending outboard to the planes of the said side walls, certain of said gusset sheets being disposed in the transverse planes of the truck supports and constituting means for supporting said parts upon the trucks.

18. In a dumping car, two continuous center-sills located inboard of the truck wheels and providing a discharge passage between them, a hopper body carried by said sills and having inclined side floors with their inboard margins secured to said sills and extended beyond the ends of said discharge passage.

19. In a dumping car, two continuous center-sills extending from buffer to buffer and providing a discharge space between them, said sills being deeper at their central portions than at their ends, in combination with inclined side floors with their inboard margins secured to said sills and extended beyond the ends of said discharge passage.

20. In a dumping car, two center-sills forming between them a discharge passage and a car body on said sills having inwardly inclined side floors secured thereto, the lower margins of said side floors being of a length not less that the distance between the truck centers, and a series of supporting members for said floors in the exterior angles between them and said sills.

21. In a dumping car, two continuous sills located inboard of the truck wheels and extending from buffer to buffer, said sills providing a discharge passage between them, in combination with inclined side floors secured by their lower margins to said sills, leading to said passage and coextensive with said sills for the distance between the points of sill support, and a series of angle braces secured in the angles between said floors and the sides of said sills.

22. In a dumping car, two continuous center-sills extending from buffer to buffer and providing a discharge space between them, said sills being deeper at their central portions than at their portions over the trucks, in combination with inclined side floors secured by their lower margins to said sills and coextensive therewith for the distance between the truck centers, and a series of upright sheet metal plates in the angles between said sills and inclined floors.

23. In a dumping car, two continuous center-sills spaced apart to provide a discharge passage, and bolster plates near the ends of said sills, in combination with inclined side floors leading to said passage and secured to said sill, said floors being connected at their ends to the ends of said bolster plates.

24. In a dumping car, two center-sills and truck supports therefor, a car body having side floors located outboard of said sills and extended longitudinally beyond the truck centers, in combination with a series of gusset sheets in the angle between the said sheets and center-sills.

25. In a dumping car, two continuous center-sills and truck supports therefor, said sills having greater depth between supports than at their ends, in combination with side floors secured by their inboard margins to said sills and extending beyond the truck supports and vertical sheet metal plates secured in the angle between said floor and the deeper portions of said sills.

26. In a dumping car, two continuous center-sills and bolster plates for supporting same, a car body having inclined side floors located outboard of said sills and spanning the distance between bolster plates, in combination with a series of angles braces between the sills and floor, and strut supports between the ends of said floors and the bolster plates.

27. In a hopper bottom dumping car two longitudinal sills located inboard of the truck wheels and providing an inter-sill discharge passage between them, inclined side-floors leading to said passage and coextensive with said sills for the distance between the points of truck support, in combination with a body-bolster construction supporting said members, comprising a transverse upright bolster-plate uniting said sills and upright gusset sheets disposed in the exterior angle between said sills and inclined side floors, and both said plate and sheets being disposed in approximately the vertical plane of the truck bolster.

28. In a dumping car having two center sills spaced apart to provide a central discharge passage between them and extending from buffer to buffer, the combination with a cross-member uniting the ends of said sills, a draw-bar located in an opening thereof, and two bars diverging from said opening toward the sills and respectively secured to said sills at or near the body-bolster of the car, said divergent bars being provided with means for receiving the strain of said draw-bar.

29. In a dumping car having two continuous center-sills spaced apart to provide a discharge passage between them, the combination of draft rigging connected to the ends of said sills and push-pole brackets secured to the exterior of said center sills.

30. A dumping car having two continuous center-sills and inclined side-floors rested upon and rigidly interbraced with said sills for the distance between truck centers, in combination with draft rigging connected with said sills and push-pole brackets secured to the ends of said sill at the four corners of the car.

31. A dumping car having two continuous spaced-apart center-sills, series of exterior upwardly inclined supporting members secured at intervals along said sills, and inclined hopper-bottom side floors secured to said members and leading to the space between the sills, in combination with push-pole brackets secured to the ends of said sills at the four corners of the car.

32. In a dumping car having two center sills extending from buffer to buffer, the combination of inwardly projecting brackets at the end of said sills, with the draw-bar between them and exterior push-pole brackets secured to the said sills at the corners of the car.

33. In a dumping car having two continuous center-sills, the combination of inwardly projecting brackets secured at the ends of said sills and a cross member uniting said ends, with push-pole brackets comprising transverse beams secured to said sill abaft the said cross member, diagonal struts supporting said beams and push-pole sockets supported by said beams and struts.

34. In a dumping car, two continuous center-sills formed of sheet-metal plates spaced apart to form an intermediate discharge opening and having greater depth at their central portions than at their ends, angle bars secured to the lower margins of said plates and dumping valves pivotally supported on said angle bars.

35. In a dumping car, two longitudinal center-sills resting by their ends upon a bolster plate, in combination with two inclined side floors with their lower inboard margins respectively secured to the tops of said sills, and vertical bracing members secured to and between the said floors, sills and the laterally projecting ends of the said bolster-plate.

36. In a dumping car, two spaced center-sills and inclined side floors united thereto and leading to the space between them, said united sills and floors being extended to a point over the truck-bolster, gusset sheets secured at intervals in the exterior angle between said sills and floors adapted to support the outer margins of the latter, in combination with a transverse bolster-plate beneath said sills and secured to the lower portions of certain of said gusset sheets.

37. In a dumping car, two spaced center sills, inclined side floors leading to the space between them, said sills and floors being extended to a point over the location of the truck-bolster, gusset sheets secured in the exterior angle between said sills and floors adapted to support the outer margins of the latter, in combination with a transverse bolster-plate secured to the lower margins of said sheets and reinforcing braces for said sheets extending from a point near the lower margin of said floors to the ends of said bolster-plate.

38. In a dumping car, vertical side walls having vertical cleats secured on their outer sides, inclined side floors and two center-sills secured to the inboard margins of said floors, said united sills and floors being continuous between the truck centers, in combination with series of gusset sheets in the angle between said sills and floors, secured to the bases of said vertical cleats.

39. In a dumping car, two center-sills continuous from buffer to buffer, located inboard of the truck-wheels and forming a passage between them, a hopper-bottom car body borne by said sills, a hollow cross-brace between said sills and a sheave journaled inside of said cross-brace, a pivoted valve for said passage, and flexible connections from said valve passing over said inclosed sheave to the exterior of the sills.

40. In a dumping car, two continuous center-sills extending from buffer to buffer and hollow cross-braces spacing said sills apart, valves pivoted at the lower margins of said sills, a series of exterior and upwardly inclined supporting members secured at intervals along said sills and inclined cargo floors carried by said members, in combination with a valve-operating shaft exterior and parallel to said sills, and operating connections on said shaft passing through said cross-braces and connected with the valves.

41. A hopper bottom dumping car having girder type center sills spaced apart substantially as set forth, and load carrying pockets between the center sills and dumping doors between the center sills, said narrow dumping doors following the contour of the lower edges of said girder type center sills, substantially as specified.

42. A dump car having steel center sills spaced apart substantially as set forth and forming load carrying pockets between them, and provided with central dump doors between the center sills, substantially as specified.

43. A dump car having steel girder type center sills spaced apart substantially as set forth, and a load carrying space between the center sills below the general floor of the car, and provided with dump doors hinged at their outer edges to the lower edges of the center sills, said dump doors following the contour of the lower edges of said girder type center sills, substantially as specified.

44. A dump car having steel center sills spaced apart substantially as set forth, a load carrying space between the center sills below the general floor of the car, and provided with dump doors hinged at their outer edges to the lower edges of the center sills, and means for raising and lowering said dump doors, substantially as specified.

In testimony whereof, I have signed my name to the specification in the presence of two subscribing witnesses.

JOHN M. GOODWIN.

Witnesses:
   A. A. LORZER,
   H. G. KIMBALL.